(12) United States Patent
Barry et al.

(10) Patent No.: US 6,273,936 B1
(45) Date of Patent: Aug. 14, 2001

(54) PROCESS AND PLANT FOR PRODUCING A VARIABLE GAS OUTPUT

(75) Inventors: Lionel Barry, Charenton le Pont; Xavier Vigor, Paris Cedex, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/414,603

(22) Filed: Oct. 8, 1999

(30) Foreign Application Priority Data

Oct. 9, 1998 (FR) .................................................. 98 12695

(51) Int. Cl.[7] .............................. B01D 53/22; B01D 3/14; B01D 53/04

(52) U.S. Cl. ........................... 95/12; 95/22; 95/23; 95/45; 95/130; 96/4; 96/111; 96/113

(58) Field of Search .............................. 95/8, 12, 19, 22, 95/23, 45, 47–55, 130, 138; 96/4, 111, 109, 113–115

(56) References Cited

U.S. PATENT DOCUMENTS

| 4,717,396 | * | 1/1988 | Stengle et al. ............................ 95/22 |
| 4,806,132 | * | 2/1989 | Campbell ................................. 95/12 |
| 4,846,850 | * | 7/1989 | Webb ...................................... 95/19 |
| 4,857,082 | * | 8/1989 | DiMartino, Sr. et al. ................ 95/19 |
| 5,131,929 | * | 7/1992 | Brockmann et al. ..................... 95/52 |
| 5,266,101 | * | 11/1993 | Barbe et al. .......................... 95/47 X |
| 5,281,253 | * | 1/1994 | Thompson ............................. 95/22 |
| 5,730,778 | | 3/1998 | Hill et al. ................................ 95/12 |
| 5,746,806 | * | 5/1998 | Aylsworth et al. ................ 96/130 X |
| 5,876,485 | * | 3/1999 | Andreani ............................ 96/144 X |

FOREIGN PATENT DOCUMENTS

| 0 821 992 | | 2/1998 | (EP) . | |
| 63-236517 | * | 10/1988 | (JP) ........................................ 95/52 |
| 63-296819 | * | 12/1988 | (JP) ........................................ 95/45 |
| 3-267109 | * | 11/1991 | (JP) ........................................ 95/51 |
| 5-084418 | | 4/1993 | (JP) . | |

* cited by examiner

*Primary Examiner*—Robert H. Spitzer
(74) *Attorney, Agent, or Firm*—Young & Thompson

(57) ABSTRACT

In this process, the apparatus for separating the feed gas is connected to the delivery side of at least one variable-rotation-speed compressor, whose speed is controlled on the basis of the measurement of a parameter representative of the flow of gas product. The process is useful in the production of nitrogen from atmospheric air.

18 Claims, 2 Drawing Sheets

PROCESS AND PLANT FOR PRODUCING A VARIABLE GAS OUTPUT

FIELD OF THE INVENTION

The present invention relates to a process for separating a compressed feed gas, especially compressed air, for the purpose of delivering to a user a variable output of a gas product, especially nitrogen, by means of a variable-capacity separation apparatus fed by a compression apparatus.

The invention applies especially to the production of nitrogen from atmospheric air by distillation or by permeation.

BACKGROUND OF THE INVENTION

The use of variable-output air separation apparatuses is tending to increase, because of the advantages of standardization that they afford: the design costs are amortized over more apparatuses, the grouping of the procurements makes it possible to reduce their cost, the mass-production effect decreases the unit manufacturing cost of the apparatuses, it is possible to stock the apparatuses in order to reduce the delivery time to customers since it is known that they can meet a wide range of demands, the maintenance operations are simplified and the stock of spare parts reduced, etc.

However, variable-output separation apparatuses pose problems when adapting the apparatus itself and its feed compressor to variable operating conditions, so as to maintain for as long as possible the separation performance and the specific energy consumption.

Thus, it is known to control small air distillation apparatuses on an on/off basis: they stop when the nitrogen pressure in the user network increases up to a predetermined high threshold and restart when this pressure comes back down to a predetermined low threshold.

The drawback of this method is that the distillation apparatus takes a great deal of time to restart and, throughout the duration of restarting its compressor is consuming its nominal energy with no nitrogen being produced. If it is desired to reduce the number of stop/restart cycles, a buffer tank of large volume must be installed.

It is also known to vent the excess nitrogen output. The specific energy is then, of course, increased accordingly.

SUMMARY OF THE INVENTION

The object of the invention is to allow satisfactory operation of the gas separation apparatuses over a relatively wide range of variation of the output produced with respect to the nominal output.

For this purpose, the invention proposes a process in which:

only a portion of the flow of feed gas is compressed by means of at least a first, variable-rotation-speed compressor (2), a predetermined flow of this gas being compressed by at least a second, fixed-rotation-speed compressor (2A) connected in parallel with the first compressor (2);

at least one parameter representative of the gas output demanded by the user is measured; and the speed of rotation of the first compressor (2) is controlled according to this measurement.

The process according to the invention may furthermore include one or more of the following characteristics, taken separately or in any of their technically possible combinations:

the portion of the flow of feed gas delivered by the first compressor covers the entire range of capacity variation of the separation apparatus;

the parameter is the pressure and/or the flow rate of the feed gas or of the gas product, and/or the purity of the gas product;

the output of a residual gas from the separation apparatus or the output of the gas product is controlled according to the speed of rotation of the compressor;

The subject of the invention is also a plant intended for the implementation of the process defined above.

This plant, of the type comprising a variable-capacity separation apparatus and an apparatus for compressing the feed gas, the delivery side of which is connected to the inlet of this apparatus, is characterized in that:

the compression apparatus (2; 2A) comprises, in parallel, at least a first, variable-rotation-speed compressor (2), provided with a variable-speed drive (9), and at least a second, fixed-rotation-speed compressor (2A);

and in that it comprises means (8) for measuring at least one parameter representative of the gas output demanded by the user, which means are connected to means (10) for controlling the variable-speed drive (9).

The subject of the invention is also a range of gas separation plants, characterized in that it comprises:

a common separation apparatus, at least one common variable-speed compressor and at least one fixed-speed compressor; and means for driving the compressor at different speeds depending on the plant in the range.

These means may comprise a common motor and a range of drives having different ratios depending on the plant in the range, or a common variable-speed motor controlled by an electronic variable-speed drive.

BRIEF DESCRIPTION OF THE DRAWINGS

Examples of plants suitable for implementing the invention will now be described with regard to the appended drawings, in which.

DETAILED DESCRIPTION OF THE INVENTION

Figure 1:
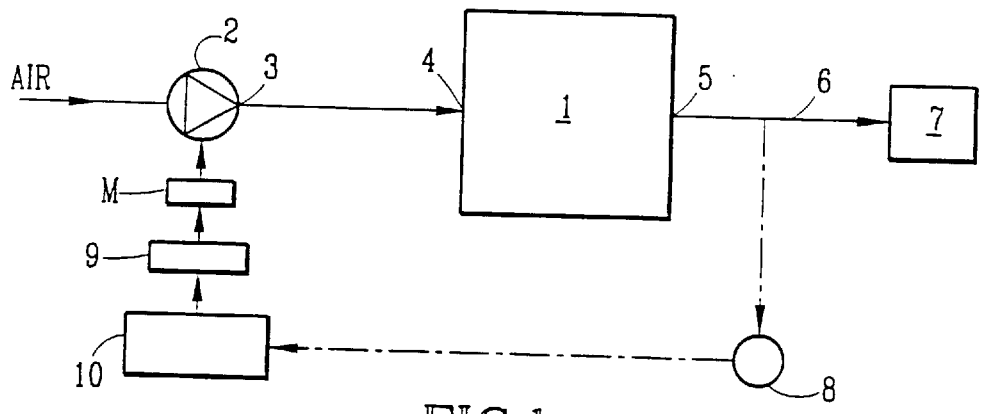
FIGS. 1 and 2 illustrate, in a schematic manner, two nitrogen production plants suitable for the invention.

In the embodiment shown schematically in FIG. 1, the plant comprises essentially an air separation apparatus 1, of the type operating by membrane permeation or by pressure swing adsorption, fed by a first, variable-speed air compressor 2. The latter takes in atmospheric air and its delivery side 3 is connected to the air inlet 4 of the apparatus 1. The outlet 5 for the nitrogen produced by this apparatus is connected, via a utilization line 6 without a valve, to a user network 7.

According to one aspect of the invention, the plant also comprises a device 8 for measuring at least one parameter representative of the nitrogen demand of the network 7. This device is, for example, a pressure sensor, a flow meter and/or a gas analyzer connected to the line 6, as shown. In the first two cases, the fact that the pressure is approximately the same at the inlet and at the outlet of the apparatus 1, whereas the air flow rate is approximately proportional to the nitrogen flow rate, the measurement device 8 may also be connected upstream to the line which connects the compressor to the separation apparatus. The device 8 may also be a signal generator which generates a signal representative of a set output demanded by the user.

The compressor 2 is driven by a variable-rotation-speed electric motor M, which is controlled by an electronic variable-speed drive 9. This variable-speed drive, consisting of a frequency changer, is controlled by an electronic control unit 10 which processes the information delivered by the measurement device 8.

When the nitrogen output demand decreases, the device 8 detects this reduction in output, or an increase in the nitrogen pressure, or else a reduction in the purity of the nitrogen. The device 8 sends a corresponding signal to the control unit 10, which sends a speed-reduction signal to the variable-speed drive 9. The air flow rate is thus reduced, with a corresponding reduction in the energy consumed, and the operating pressure of the apparatus 1 is reduced.

Thus, the performance of the apparatus 1 and the specific energy are only slightly affected by the reduced operation of the plant.

Figure 2:
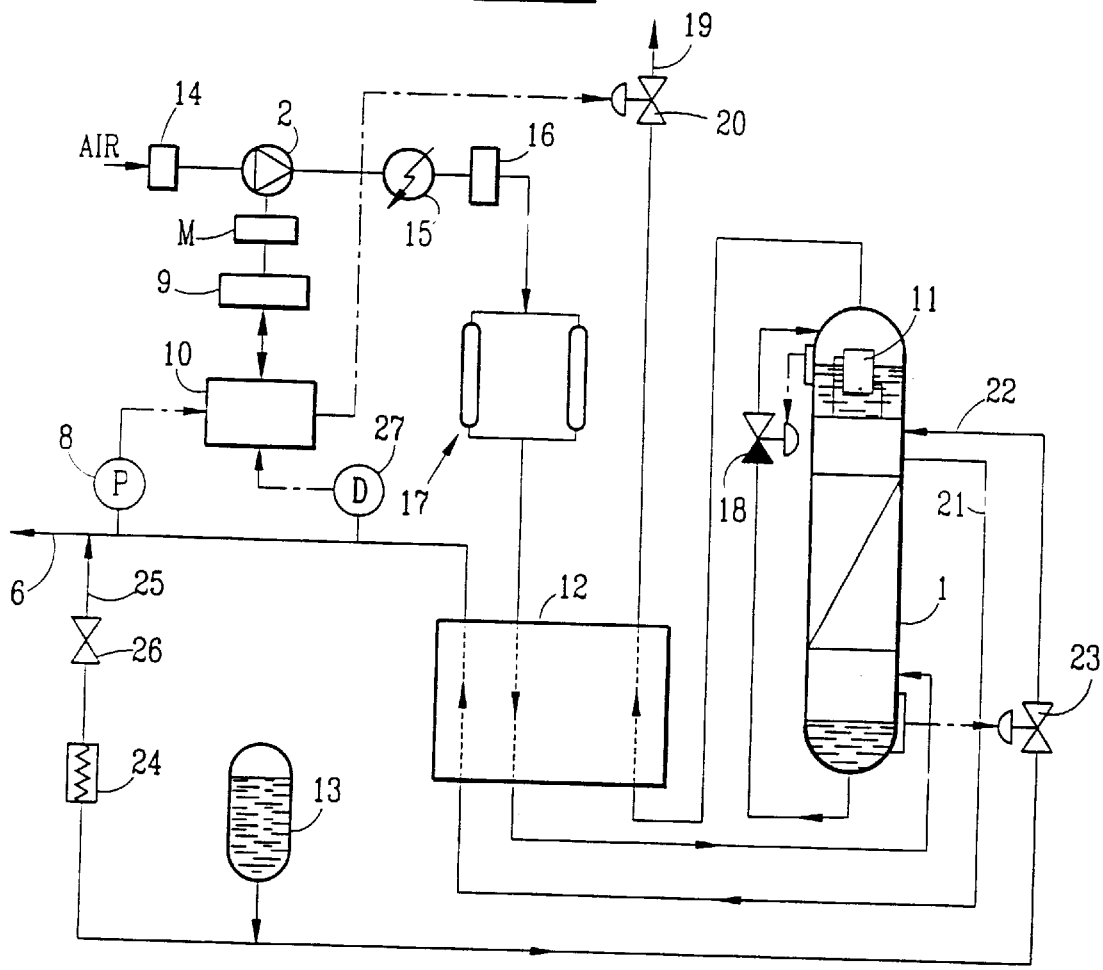

The air distillation plant shown in FIG. 2 also operates according to this principle. In this example, the apparatus 1 is an air distillation column of the HPN (High Purity Nitrogen) type having at the top a nitrogen condenser 11. This column is associated with a heat-exchange line 12 and with a liquid-nitrogen tank 13. Its nominal nitrogen output is 750 Sm$^3$/h at 9 bar absolute.

The incoming air, filtered at 14, is compressed to the distillation pressure by the compressor 2, cooled to the vicinity of the ambient temperature at 15, filtered again at 16, and dried—decarbonated by adsorption at 17. Next, the air is cooled to the vicinity of its dew point in the exchange line 12 and then introduced into the bottom of the column 1. The "rich liquid" (oxygen-enriched air) collected in the bottom of the column is, after expansion in an expansion valve 18, introduced into the shell of the condenser 11, where it vaporizes. The level of the liquid in this condenser controls the expansion valve 18. The vaporized rich liquid constitutes the residual gas of the plant. After warming at 12, it is discharged via a line 19 fitted with a control valve 20. The adsorbent 17 may then be regenerated (an operation not shown).

The nitrogen produced, withdrawn from the top of the column 1 via a line 21, is warmed at 12 and sent into the utilization line 6.

The refrigeration of the plant is maintained by "tippling" of liquid nitrogen withdrawn from the tank 13 and introduced into the top of the column via a line 22 fitted with a control valve 23. The latter is controlled so as to keep the liquid level in the bottom of the column constant. If necessary, additional liquid nitrogen withdrawn from the tank 13 may be vaporized in an auxiliary vaporizer 24 and added into the line 6 via a line 25 fitted with a valve 26.

In this example, the measurement device 8 is a pressure sensor connected to the line 6 upstream of the point of entry of the line 24.

Figure 3:
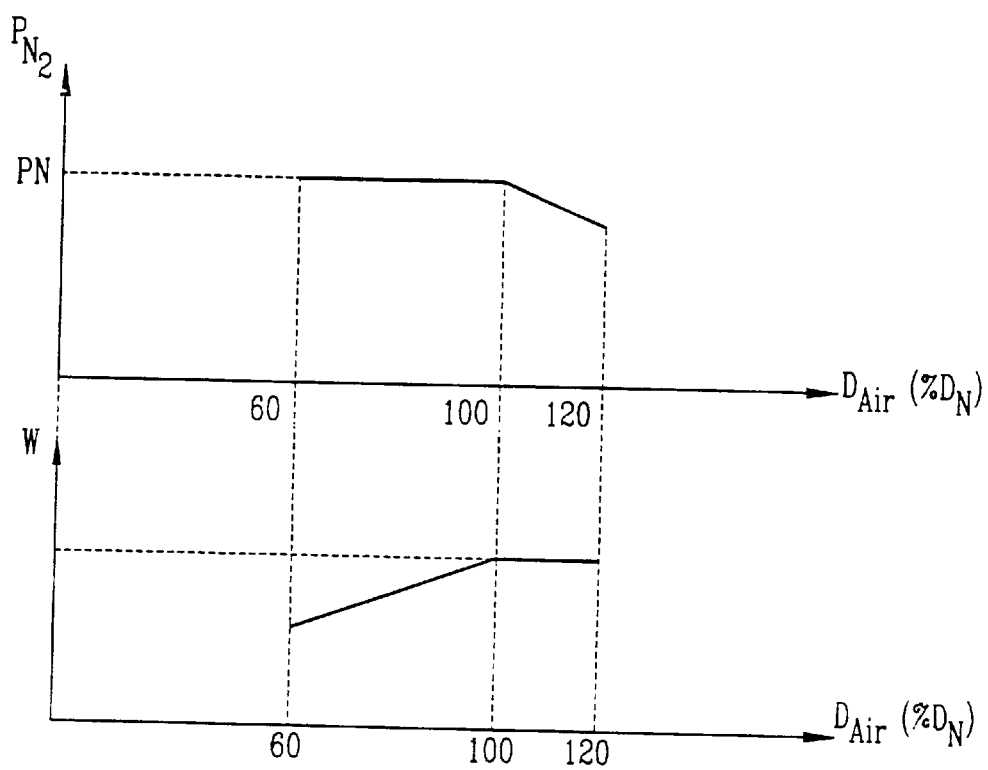
FIG. 3 is a diagram which illustrates the variations in the nitrogen pressure and in the electric power consumed as a function of the air flow rate.

When operating at an output below the nominal output (FIGS. 2 and 3), the control unit computes a rotation speed setting for the variable-speed compressor 2 so as to maintain an approximately constant nitrogen pressure PN. The power consumed W is less than the nominal power consumed by the motor and the variable-speed drive of the compressor, and gradually increases with the output.

On the other hand, when operating at an output above the nominal output, the speed setting is computed so as to follow a computed speed/pressure curve so as to keep the nominal pressure of the motor and of the variable-speed drive approximately constant, while the nitrogen pressure gradually decreases when the output increases.

Thus, the flow rate of air treated is controlled. In addition, in order to maintain the performance, especially the energy performance, of the apparatus, the output of nitrogen produced is adapted in the following manner: the extraction factor (nitrogen flow rate/air flow rate ratio) is computed by the control unit 10 as a function of the pressure obtained in the column. This factor is approximately 40% and increases slightly when the pressure drops. Thus, a set nitrogen flow rate equal to the air flow rate (represented by the speed of rotation of the compressor) multiplied by the extraction factor is obtained. The nitrogen flow rate is measured permanently by a flow meter 27 connected to the line 6, and is compared with the set flow rate by the unit 10 in order to operate the valve 20 in the direction which cancels the deviation. This method of regulation for high outputs is very favourable since the distillation is improved when the pressure is lowered. Of course, as a variant, the valve 20 may be placed in the nitrogen line 6, with a similar mode of regulation.

Figure 4:
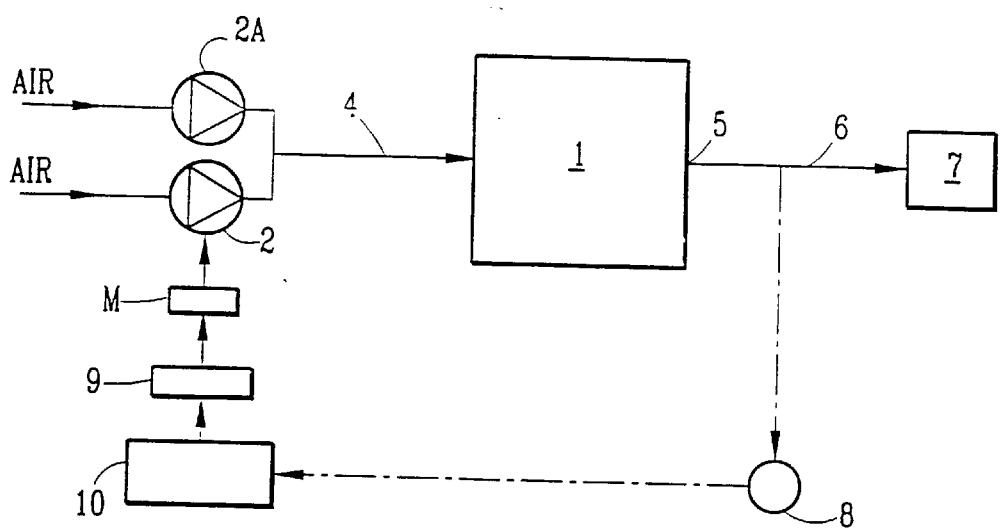
FIG. 4 is a schematic view, similar to FIG. 1, illustrating the invention.

In the descriptions of FIGS. 1 and 2 below, the variable-speed compressor 2 is assumed to be capable of delivering most of the range of corresponding air flow rates to the flexibility of the column 1, which generally corresponds to a factor of about 2, for example from 60% to 120% of the nominal output. According to one aspect of the invention however, shown schematically in FIG. 4, and applicable to both the above examples, the compression plant furthermore includes at least one additional, fixed-rotation-speed compressor 2A connected in parallel with the first, variable-speed compressor 2. The compressor 2A permanently delivers the minimum air output, i.e. typically 40% of the nominal output in the above example, and the variable-speed compressor 2 delivers the rest of the air output, i.e. 0 to 80% of the nominal output. Thus, the overall investment is reduced, as are the energy losses due to the variable-speed drive, since these losses pertain to only a fraction of the output.

By way of example, a variable-speed air compressor 2 having a lubricated screw driven by a 90 kW variable-speed asynchronous electric motor, having a nominal delivery pressure of 11 bar absolute and a nominal output of 650 Sm$^3$/h, and a fixed-speed air compressor 2A having a lubricated screw driven by a 90 kW constant-speed asynchronous electric motor, this motor having a nominal delivery pressure of 11 bar absolute and a nominal output of 700 Sm$^3$/h, may be provided.

The invention can be used to deliver a range of plants having staggered capacities, with a common separation apparatus, a common compressor and means for driving the latter at different speeds that may be predetermined. In the latter case, the electronic variable-speed drive which controls the motor of the compressor may be replaced with a simpler arrangement consisting of a range of drives with different ratios, for example a range of pulley/belt assemblies interposed between the motor, which rotates at a fixed speed, and the compressor. Thus, a high degree of standardization may be achieved, especially for plants of small size, that is to say in the case of the production of nitrogen by air distillation, producing for example from approximately 200 to 1500 Sm$^3$/h.

What is claimed is:

1. Process for separating a compressed feed gas, for the purpose of delivering to a user a variable output of a gas product, by means of a variable-capacity separation apparatus fed by a compression apparatus including a first, variable-rotation-speed compressor and a second, fixed-rotation-speed compressor connected in parallel with said first compressor; the process comprising:

compressing only a portion of the flow of feed gas by means of at least said first, variable-rotation-speed compressor;

compressing a predetermined flow of said gas by at least said second, fixed-rotation-speed compressor;

measuring at least one parameter representative of the gas output demanded by the user; and controlling the speed of rotation of the first compressor according to the measurement.

2. The process according to claim 1, wherein said portion of the flow of feed gas compressed by the first compressor covers most of the range of capacity variation of the separation apparatus.

3. The process according to claim 1, wherein said parameter is at least one of the pressure and the flow rate of at least one of the feed gas and the gas product.

4. The process according to claim 1, wherein said parameter is the purity of the gas product.

5. The process according to claim 1, wherein the output of a residual gas from the separation apparatus or the output of the gas product is controlled according to the speed of rotation of said first compressor.

6. The process according to claim 1, wherein within a lower range of variation of the flow of feed gas, ranging from the minimum capacity of the separation apparatus to the nominal output, the power consumed by the first compressor is increased when the output increases, while still keeping the delivery pressure of said first compressor approximately constant; whereas, within an upper range of variation of the flow of feed gas, ranging from the nominal output to the maximum capacity of the separation apparatus, the power consumed by the first compressor is kept approximately constant by decreasing the delivery pressure of said first compressor when the output increases.

7. The process according to claim 1, wherein the feed gas is air and the gas product is at least one of nitrogen and oxygen.

8. The process according to claim 1, wherein separation of the feed gas takes place by permeation.

9. The process according to claim 1, wherein separation of the feed gas takes place by distillation.

10. Plant for separating a compressed feed gas, for the purpose of delivering to a user a variable output of a gas product, the plant comprising:

a variable-capacity separation apparatus having an inlet;

a compression apparatus for compressing the feed gas, and having a delivery side connected to the inlet of said separation apparatus;

said compression apparatus comprising, in parallel, at least a first, variable-rotation-speed compressor having a variable-speed drive, and at least a second, fixed-rotation-speed compressor;

measurement means for measuring at least one parameter representative of the gas output demanded by the user; said measurement means being connected to control means for controlling the variable-speed drive.

11. The plant according to claim 10, wherein the first compressor is designed to cover a feed-gas flow-rate range which covers most of the range of capacity variation of the separation apparatus.

12. The plant according to claim 10, wherein said measurement means comprise at least one of a pressure sensor and a flow meter, connected to at least one of the stream of feed gas and the stream of gas product.

13. The plant according to claim 10, wherein said measurement means comprise a gas analyzer connected to the stream of gas product.

14. The plant according to claim 10, further comprising computing means for computing a set speed for the first compressor so as to keep the pressure of the power consumed approximately constant.

15. The plant according to claim 14, further comprising regulating means for regulating at least one of the output of residual gas from the separation apparatus and the output of the gas product; said regulating means being controlled by said computing means.

16. A range of gas separation plants having staggered capacities, comprising:

a common separation apparatus, at least one common variable-speed compressor, and at least one fixed-speed compressor; and means for driving the variable-speed compressor at different speeds depending on the plant capacity.

17. The range according to claim 16, wherein said means comprise a common motor and a range of drives having different ratios depending on the plant capacity.

18. The range according to claim 16, wherein said means comprise a common variable-speed motor controlled by an electronic variable-speed drive.

* * * * *